United States Patent [19]

Morner

[11] Patent Number: 4,934,838

[45] Date of Patent: Jun. 19, 1990

[54] FRAME MEMBER FOR SUPPORTING MULTIPLE BEARINGS WITH HEAT BARRIER SLOT

[75] Inventor: Robert W. Morner, Hamilton, Ohio

[73] Assignee: The Hamilton Tool Company, Hamilton, Ohio

[21] Appl. No.: 425,036

[22] Filed: Oct. 23, 1989

[51] Int. Cl.$^5$ ............................................. F16C 19/52
[52] U.S. Cl. .................................. 384/476; 384/493; 384/557
[58] Field of Search ............... 384/317, 476, 493, 557, 384/605, 900, 905

[56] References Cited

U.S. PATENT DOCUMENTS

| | | | |
|---|---|---|---|
| 2,344,240 | 3/1944 | Firth. | |
| 2,714,538 | 8/1955 | Hornbostel | 384/476 |
| 4,226,485 | 10/1980 | Pruvot | 384/557 |
| 4,473,309 | 9/1984 | Box | 384/905 X |
| 4,883,369 | 11/1989 | Jude et al. | 384/476 |

Primary Examiner—Thomas R. Hannon
Attorney, Agent, or Firm—Wood, Herron & Evans

[57] ABSTRACT

A frame member, or bearing block, for supporting bearings for two or more parallel shafts includes two spaced bearing receiving bores and a heat barrier slot. The heat barrier slot includes a transverse segment which extends between the two bearing receiving bores and longitudinal segments which extend outwardly beyond the centers of at least one of the bores. The bearing block can be provided with three or more bores for supporting three or more parallel rolls. In the latter case the heat barrier slot includes a center section of Y-shaped configuration including transverse segments disposed between each pair of bores and endwise segments extending outwardly beyond the center of each bore.

11 Claims, 2 Drawing Sheets

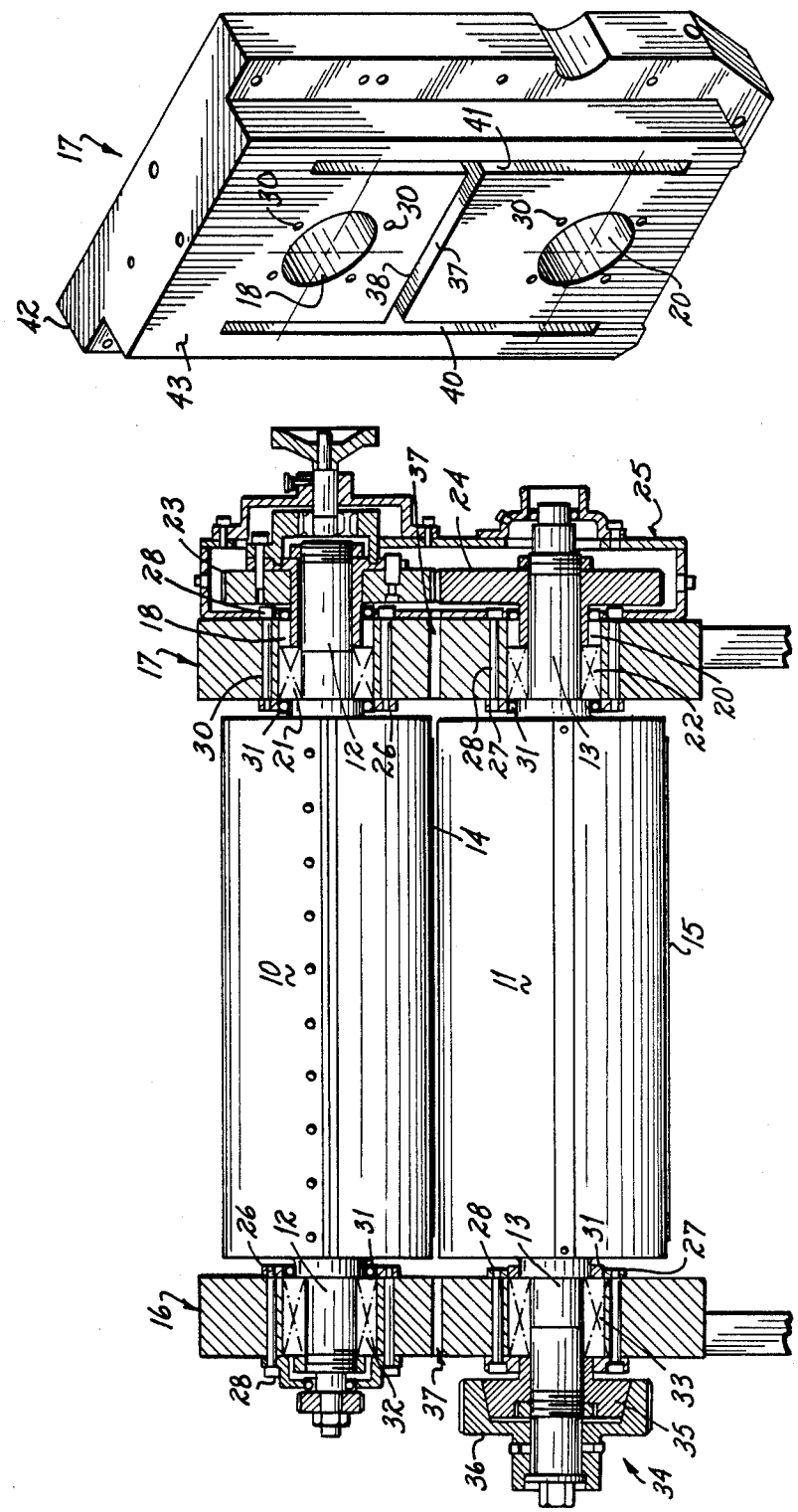

FRAME MEMBER FOR SUPPORTING MULTIPLE BEARINGS WITH HEAT BARRIER SLOT

The present invention relates to equipment such as printing and perforating or cutting equipment which incorporates two or more parallel cooperating cylinders. The invention is particularly directed to frame members or bearing blocks for supporting the bearings which journal the shafts of these cylinders in such a manner that the cylinder shafts remain parallel despite any heating which may occur in the bearings.

BACKGROUND OF THE INVENTION

It is common practice in many different forms of equipment to utilize two or more cooperating cylinders or rolls to perform functions such as printing, perforating and cutting. It is highly important in many such machines that the two rolls be supported to closely maintain their center distances to ensure optimum printing, perforating or cutting. It is common practice to support the shafts of such rolls in common frame members or bearing blocks mounted on either side of the roller. These bearing blocks are provided with two or more bores for receiving the bearings which journal the shafts. Commonly, after a period of use, the bearings heat up and, in turn, heat up the bearing blocks. In prior machines, this has caused the bearing blocks to expand in such a manner that the center lines of the shafts supporting the rolls tend to separate causing the rolls to move away from one another and lose the optimum printing or cutting pressure.

SUMMARY OF THE PRESENT INVENTION

The principal object of the present invention is to provide a frame or bearing block construction for supporting bearings for two or more parallel rolls in such a manner that the center line distance between rolls remains substantially constant despite any heating of the bearings and heating of the bearing block.

In accordance present invention, this result is achieved by providing a bearing block having a heat barrier slot cut through the bearing block in the portion of the block between the two bearing receiving bores. As a result, there is no continuous path of metal between the two bores. Any heating of the bearing block does not result in an expansion of a solid metal member extending from one bore to the other and accordingly the center lines of the two bores are not forced apart.

In a preferred form of bearing block constructed in accordance with the present invention, the heat barrier slot includes a transverse segment which extends substantially perpendicular to a line interconnecting the centers of the two bores. The heat barrier slot further comprises two longitudinal segments which extend from the ends of the transverse segment outwardly beyond a diameter of the bore extending parallel to the transverse segment or perpendicular to the line joining the centers of the two bores.

In one embodiment the heat barrier slot is of U-shaped configuration as described above. In another embodiment the slot is of H-shaped configuration with longitudinal segments extending outwardly past the centers of both bores.

The principles of the present invention can also be extended to bearing blocks for supporting three or more rolls. In a preferred form of block for supporting three rolls the barrier slot includes a center Y-section have three transverse legs, one of which extends between each adjacent pairs of rolls. The barrier slot also includes endwise segments which extend outwardly from the ends of the transverse segments beyond the center of each roll.

One advantage of the present frame construction is that it is effective to maintain a uniform spacing between two parallel rolls even after extensive periods of continuous use. Moreover, the spacing between the roll centers is maintained constant even in installations where the rolls operate under appreciable pressure with appreciable heat build-up in the bearings.

Another advantage of the present invention is that the bearing supports are relatively economical to produce. The present bearing support structure introduces no additional movable elements and does not increase the maintenance requirements of the equipment in which it is installed.

These and other objects and advantages of the present invention will be more readily apparent from a consideration of the following detailed description of the drawings illustrating a preferred embodiment of the invention.

BRIEF DESCRIPTION OF THE DRAWINGS

FIG. 1 is an elevational view partly in section showing a perforator including two cylinders and bearing blocks embodying the present invention for supporting the cylinders.

FIG. 2 is a perspective view of a bearing mounting block of the present invention.

DESCRIPTION OF A PREFERRED EMBODIMENT

Figure 3:
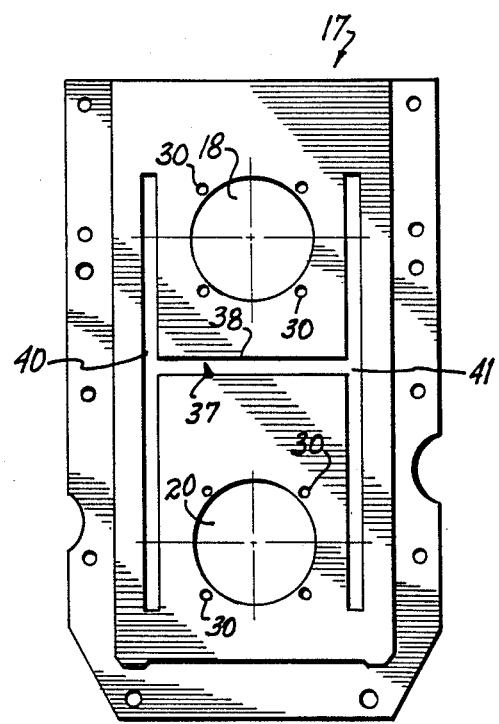
FIG. 3 is a front elevational view of the bearing block shown in FIG. 2.

The bearing blocks of the present invention have particular applicability in connection with equipment employing multiple cylinders for printing, cutting, or perforating. A portion of a typical apparatus for perforating is shown in FIG. 1. As there shown, the perforating apparatus includes two cylinders 10, 11. These cylinders are mounted on parallel shafts 12, 13. Upper cylinder 10 carries a plurality of perforating blades 14 extending outwardly from the periphery of the cylinder. These perforator blades 14 can be mounted in any suitable manner, one form of mounting being shown in U.S. Pat. No. 4,848,202 for "Cut Off or Cross Perforator Scoring Cylinder With Quick Blade Release". Lower cylinder 11 preferably carries a plurality of hard anvil inserts 15 extending outwardly from the periphery of cylinder 11. The construction of these inserts is well known in the art. It is to be understood that the construction of the cylinders 10, 11, the perforating blades, and anvil inserts constitute no part of the present invention and that the bearing blocks of this invention can be used with other types of cylinders, for example, printing cylinders.

Shafts 12, 13 are mounted upon two frame members or bearing blocks 16, 17. In the apparatus shown, bearing block 17 is disposed upon the operator side of the machine while bearing block 16 is disposed on the opposite or gear side of the machine. It is to be understood that the bearing blocks are substantially identical with one another. Block 17 is illustrated in FIG. 2, however, it is to be understood that the description of this block is equally applicable to block 16. Block 17 is provided with an upper bore 18 and a lower bore 20 for receiving bearings which journal the right hand ends of shafts 12, 13. More particularly, shaft 12 is journaled in a bearing 21 comprising, by way of example, a Timken bearing cone no. 366 and a cup 363-D. The right hand end of shaft 13 is similarly mounted in a bearing 22 similar to bearing 21. The ends of shafts 12 and 13 are interconnected by a gear train including gears 23 and 24. Gear 23 is mounted on shaft 12 and meshes with gear 24 carried by shaft 13. These gears are effective to impart rotational movement of shaft 13 to shaft 12. Gears 23 and 24 are enclosed in a suitable gear housing 25. Bearings 21, 22 are retained by suitable bearing caps 26, 27 held in place by bolts 28 passing through bolt holes 30 drilled in bearing block 17. Bearings 21, 22 are provided with suitable oil seals 31 in a manner well known in the art.

The opposite ends of shafts 12, 13 are journaled in bearings 32, 33 which are mounted in upper and lower bores of bearing plate 16. It is to be understood that the upper and lower bores in bearing plate 16 correspond to bores 18, 20 of bearing plate 17. Bearings 32, 33 are preferably identical with bearings 21, 22 and are secured in place and sealed in the same manner as bearings 21, 22.

The left hand edge of shaft 13 carries a friction clutch unit 34 through which power is applied from a drive motor to rotate shafts 13, 12. Friction clutch 34 includes an inner cone 35 and a cooperating outer gear member 36. The construction such clutches are well known and constitute no part of the present invention. Thus, in operation gear 36 is connected to the output of a suitable motor (not shown). Rotation of this gear drives shaft 13 and shaft 12 is, in turn, driven through gears 24, 23. During the operation of the perforating device, considerable heat is generated in bearings 21, 22, 32, 33. Heat from these bearings flows into blocks 16, 17. Nevertheless, the construction of blocks 16, 17 prevents any significant change in the distance between the center lines of shafts 12, 13. As a result, cylinders 10, 11 are maintained in the same operative relationship even after extended periods of use.

As is shown in FIG. 2, this result is achieved by means of a slot 37 which extends transversely through the entire thickness of block 17. As shown in FIG. 2, slot 37 is generally of an H-shaped configuration including a transverse segment 38 disposed between bores 18, 20 and extending a right angle to a line joining the center line of these two bores. Two parallel longitudinal segments of slot 37 intersect the ends of transverse segment 38 and are generally perpendicular to that segment. Longitudinal slots 40, 41 extend upwardly above the uppermost portion of bore 18 and downwardly below the lowermost portion of bore 20. While this configuration of slot has been found to be particularly advantageous it is important that the longitudinal slots extend at least upwardly or downwardly past the horizontal center line of one of the bores 18, 20.

The typical dimensions of a bearing block such as bearing block 17 are approximately 4 inches in total thickness with the main section 42 being 2⅜ inches thick with the central projecting portion 43 extending 1⅝ inches beyond the main section 42, so that the total thickness of the block in this area is 4 inches. The bores 18, 20 are of the order of 4.33 inches in diameter while the width of the block is approximately 14.0 inches and the height of the block is approximately 19.5 inches. The width of each of the segments 38, 40, 41 is approximately 0.5 inch. It will be appreciated that the dimensions of blocks 16, 17 can be varied depending upon the apparatus in which the bearing blocks are incorporated. It is also to be understood that the diameter of bores 18, 20 can be modified to accommodate other sizes of friction or antifriction bearings.

In operation, the slot 37 functions as a heat barrier and as a relief so that even if temperature builds up in the portions of blocks 16, 17 between the upper and lower bores, the heated portions of the block simply expand into the areas of the cuts and do not tend to force the center lines of bores 18, 20 and, hence, the center lines of shafts 12, 13 apart. Rather, these center lines maintain their initial spacing irrespective of the amount of heat generated in the bearings.

Figure 4:
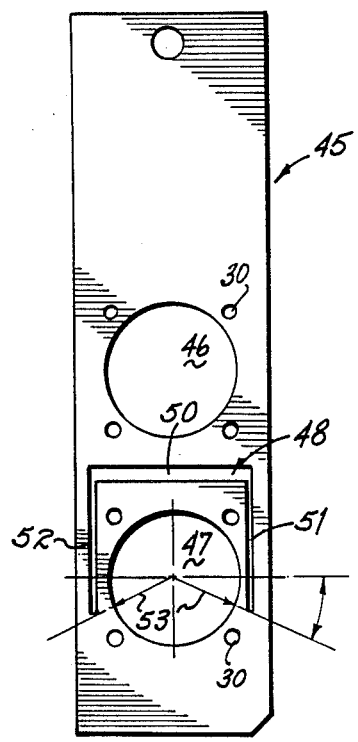
FIG. 4 is a elevational view of a modified form of bearing block.

While FIGS. 2 and 3 disclose a preferred form of bearing block, it is contemplated that the configuration of the heat barrier slots can be modified. One such modified form of bearing block 45 is shown in FIG. 4. As there shown, the bearing block 45 includes upper and lower bores 46, 47 adapted to house bearings for two parallel shafts, for example, shafts similar to shafts 12, 13 illustrated in FIG. 1. A barrier slot 48 is cut completely through bearing block 45. Slot 48 comprises a transverse section 50 disposed between bores 46, 47 and disposed at right angles to a line interconnecting the center lines of the two bores. Additionally, slot 48 comprises two longitudinal sections 51, 52 extending from the ends of transverse section 50. These slots extend downwardly past the horizontal center line of lower bore 47 and as shown terminate at radii 53 disposed at an angle of approximately 250° from the horizontal diameter of bore 47. In the embodiment illustrated in FIG. 4, the transverse segment 50 of the heat barrier slot is appreciably wider than longitudinal segments 51, 52. Suitable widths for such slots are ½ inch for transverse segment 50 and 3/32 inch for the longitudinal segments 51, 52.

Figure 5:
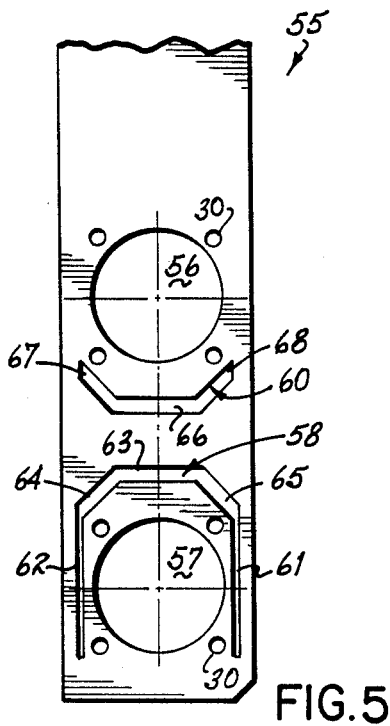
FIG. 5 is an elevational view of a second modified bearing block.

A second modified form of bearing block 55 is illustrated in FIG. 5. As there shown, the bearing block includes upper and lower bores 56, 57 adapted to receive bearings for shafts such as shafts 12, 13. Bearing block 55 is provided with two heat barrier slots 58, 60. Slot 58 is generally of U-shaped configuration and includes longitudinal segments 61, 62 extending generally parallel to a line interconnecting the centers of bores 56, 57. Slot 58 also includes a transverse segment 63 disposed between bores 56, 57 generally at right angles to segments 61 and 62 and to a line interconnecting the centers of these two bores. Short angulated sections 64, 65 interconnect transverse segment and longitudinal segments 62, 61. Preferably, segments 63, 64, 65 are substantially wider than segments 61, 62. For example, segments 63, 64, 65 can be made ½ inch in thickness while the longitudinal segments 61, 62 can be made approximately ⅛ inch in thickness. As shown in FIG. 5, longitudinal segments 61, 62 extend downwardly beyond the lowermost portion of bore 57. Again, it is essential that the longitudinal segments 61, 62 extend at least to a point below a horizontal diameter of bore 57.

The second slot 60 is of a shallow U-shaped configuration and includes a horizontal section 66 disposed intermediate the lower slot 58 and upper bore 56. Segment 66 preferably extends perpendicular to a line joining the centers of bores 56, 57. Two upwardly angulated sections 67, 68 of slot 60 are interconnected with the ends of transverse section 66. Angulated sections 67, 68 extend outwardly so that the distance between the outer ends of these angulated slot segments is greater than the maximum diameter of bore 56.

Figure 6:
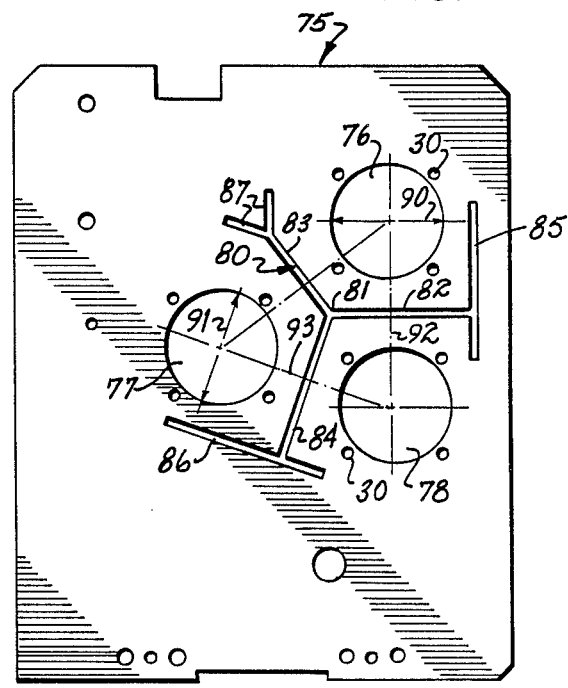
FIG. 6 is an elevational view of a third form of modified bearing block adapted to support bearing for three cooperating cylinders.

A third modified form of bearing support block 75 is illustrated in FIG. 6. As there shown, the bearing support block includes three bores 76, 77, 78 adapted to house three bearings (not shown) for three parallel shafts. Bearing block 75 further includes a heat barrier slot 80 having a center section 81 of generally Y-shaped configuration. More particularly, center section 81 of the barrier slot includes a first leg 82 disposed between bores 76, 77 along a line generally perpendicular to a line interconnecting the centers of these bores. Section 81 of heat barrier slot 80 further includes a second leg 83 disposed between bores 76, 77 along a line substantially perpendicular to a line interconnecting the centers of these bores, and a third leg 84 disposed between bores 77, 78 again along a line perpendicular to a line interconnecting the centers of these bores.

Additionally, slot 80 includes a first endwise segment 85 joined to the end of leg 82 and extending along a line generally perpendicular to by 82 and parallel to a line interconnecting the centers of bores 76, 78. Segment 85 extends upwardly beyond a horizontal diameter of bore 76 and extends downwardly below the uppermost portion of bore 78. Another endwise slot segment 86 is connected to the end of leg 84. Endwise segment 86 extends generally perpendicular to leg 84 and parallel to a line interconnecting the centers of bores 77, 78. Segment 86 extends outwardly beyond a diameter of bore 77 perpendicular to a line interconnecting the center lines of bores 77, 78. Endwise slot portion 86 also includes a segment which extends downwardly below the lowermost portion of bore 78. V-shaped segments 87 extend outwardly from the end of leg 83 parallel to legs 85 and 86. These segments extend outwardly beyond diameters 90 and 91 of bores 76 and 77 which diameters are perpendicular to lines 92 and 93 interconnecting the centers of bores 76 and 78 and bores 77 and 78, respectively.

It will be appreciated that in each embodiment a slot is provided between each pair of adjacent bores which slot includes a transverse segment extending perpendicular to a line interconnecting the centers of the bores and second and third longitudinal segments which extend from the ends of the transverse segment outwardly beyond a diameter of one of said bores which diameter is perpendicular to the aforesaid line.

From the above disclosure of the general principles of the present invention and the foregoing description of a preferred and modified embodiments, those skilled in the art will readily comprehend the various modifications to which the present invention is susceptible. Therefore, I desire to be limited only by the scope of the following claims:

I claim:

1. A bearing block for use in supporting first and second bearings for journalling first and second parallel shafts, said being block comprising:
   first and second bores for receiving said first and second bearings;
   a heat barrier slot extending through said bearing block and comprising a first transverse segment disposed intermediate said bores; and
   two longitudinal segments extending from said transverse segment on opposite sides of at least one of said bores.

2. The bearing block of claim 1 in which said bores have centers and said transverse segment extends substantially perpendicular to a line joining said centers.

3. The bearing block of claim 2 in which said longitudinal segments extend outwardly beyond a diameter of at least one of said bores which diameter extends perpendicular to said line interconnecting said centers.

4. The bearing block of claim 3 in which said longitudinal segments are substantially perpendicular to said transverse segment.

5. The bearing block of claim 4 in which said longitudinal segments and said transverse segment form a slot of generally H-shape, and said longitudinal segments extend outwardly beyond diameters of said first and second bores which diameters are perpendicular to said line interconnecting the center of said bores.

6. The bearing block of claim 1 in which said bores have centers and said longitudinal segments extend outwardly beyond a diameter of at least one of said bores disposed perpendicular to a line interconnecting said centers.

7. The bearing block of claim 6 in which said slot is generally U-shaped.

8. The bearing block of claim 7 in which said longitudinal segments are joined to said transverse segment by segments angled with respect to both said longitudinal segments and said transverse segment.

9. The bearing block of claim 7 further comprising a second U-shaped slot including a second transverse segment disposed intermediate said first and second bores.

10. The bearing block of claim 9 in which said second transverse segment extends substantially parallel to said first transverse segment.

11. A bearing block for use in supporting first, second, and third bearings for journalling first, second, and third parallel shafts, said bearing block comprising:
    first, second, and third bores for receiving said first, second, and third bearings, each of said bores having a center;
    a heat barrier slot extending through said bearing block, said heat barrier slot comprising a central section of generally Y-shaped configuration, said central section including three transverse segments, one of said segments being disposed intermediate each pair of said three bores, said barrier slot further comprising endwise longitudinal segments extending from said transverse segments, said endwise longitudinal segments extending outwardly beyond a diameter of one bore of each pair of bores which diameter is perpendicular to a line interconnecting the centers of said pair of bores.

* * * * *